(12) United States Patent
Uwazumi et al.

(10) Patent No.: US 6,767,651 B2
(45) Date of Patent: Jul. 27, 2004

(54) MAGNETIC RECORDING MEDIUM, METHOD FOR MANUFACTURING A MAGNETIC RECORDING MEDIUM AND MAGNETIC RECORDING DEVICE

(75) Inventors: Hiroyuki Uwazumi, Nagano (JP); Tadaaki Oikawa, Nagano (JP); Takahiro Shimizu, Nagano (JP); Naoki Takizawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 23 days.

(21) Appl. No.: 10/037,475

(22) Filed: Jan. 3, 2002

(65) Prior Publication Data

US 2002/0127435 A1 Sep. 12, 2002

(30) Foreign Application Priority Data

Jan. 5, 2001 (JP) ........................................ 2001-000748

(51) Int. Cl.$^7$ .............................................. G11B 5/738
(52) U.S. Cl. ..................... 428/611; 428/629; 428/632; 428/666; 428/667; 428/694 T; 428/694 TS
(58) Field of Search ................................ 428/65.3, 65.5, 428/611, 629, 632, 666, 667, 694 T, 694 TS, 694 TP, 694 BS, 694 ST, 694 SL, 900, 694 R; 204/192.2

(56) References Cited

U.S. PATENT DOCUMENTS

| | | | | |
|---|---|---|---|---|
| 5,626,970 A | * | 5/1997 | Hedgcoth | 428/611 |
| 5,665,478 A | * | 9/1997 | Suzuki et al. | 428/694 TS |
| 5,679,473 A | | 10/1997 | Murayama et al. | 428/694 |
| 5,846,648 A | * | 12/1998 | Chen et al. | 428/694 T |
| 5,989,673 A | * | 11/1999 | Xiong et al. | 428/65.3 |
| 6,020,060 A | | 2/2000 | Yoshida et al. | |
| 6,146,755 A | * | 11/2000 | Guha et al. | 428/694 T |
| 6,150,015 A | * | 11/2000 | Bertero et al. | 204/192.2 |
| 6,150,016 A | | 11/2000 | Song et al. | |
| 6,174,597 B1 | * | 1/2001 | Yusu et al. | 428/694 BA |
| 6,280,813 B1 | * | 8/2001 | Carey et al. | 428/65.5 |
| 6,403,203 B2 | * | 6/2002 | Futamoto et al. | 428/694 TM |
| 6,472,047 B1 | * | 10/2002 | Kirino et al. | 428/694 TS |
| 6,589,669 B2 | | 7/2003 | Uwazumi et al. | |
| 6,602,620 B1 | * | 8/2003 | Kikitsu et al. | 428/694 TS |
| 6,610,424 B1 | * | 8/2003 | Acharya et al. | 428/694 TM |

FOREIGN PATENT DOCUMENTS

JP 2000-311327 A1 11/2000

OTHER PUBLICATIONS

Ishida M. et al.; "High magnetic field sensitivity of TbFeCo layer and Pt/Co multilayers with an ultra–thin RE–rich RE–TM layer", IEEE Transactions on Magnetics, vol. 33, No. 5, pt. 1, pp. 3229–3231, Sep. 1997.

* cited by examiner

Primary Examiner—Stevan A. Resan
(74) Attorney, Agent, or Firm—Darby & Darby

(57) ABSTRACT

In a magnetic recording medium, a plurality of non-magnetic metallic intermediate layers is laminated between an under-layer and a magnetic layer. One of the intermediate layers is composed of at least an element selected from the group consisting of Ru, Re and Os and contains oxygen, and another is composed of a CoCr alloy containing at least an element selected from the group consisting of Nb, Mo, Ru, Rh, Pd, Ta, W, Re Os, Ir and Pt. The resulting magnetic recording medium provides reduced costs and improved recording characteristics.

10 Claims, 1 Drawing Sheet

MAGNETIC RECORDING MEDIUM, METHOD FOR MANUFACTURING A MAGNETIC RECORDING MEDIUM AND MAGNETIC RECORDING DEVICE

BACKGROUND OF THE INVENTION

1. Field of the Invention

The present invention relates to a magnetic recording medium for use in magnetic recording devices. The invention further relates to a method for manufacturing and a device employing a magnetic recording medium according to the present invention.

2. Description of the Related Art

Various compositions and structures have been proposed for magnetic layers and non-magnetic under-layers in high-recording-density and low-noise magnetic recording mediums. In particular, a magnetic layer called a granular magnetic layer, has been proposed having a structure in which ferromagnetic grain are surrounded by a non-magnetic non-metallic substance.

Japanese Unexamined Patent Application Publication No. 08-255342, discloses attaining low noise by forming a granular recording layer in which ferromagnetic grains are dispersed in a non-magnetic film, by a method including steps of sequentially depositing a non-magnetic film, a ferromagnetic film and a non-magnetic film on a non-magnetic substrate, and heat treating the laminate. In this specific non-magnetic film, oxides or nitrides of silicon are used.

U.S. Pat. No. 5,679,473 discloses a granular recording film in which each magnetic grain is surrounded and separated by a non-magnetic oxide by means of RF sputtering using a CoNiPt target including an oxide, such as $SiO_2$. A granular recording film with high coercive force and low noise is achieved by this patent. Further, since the granular magnetic layer facilitates separation of magnetic grains even by lamination without heating, an inexpensive non-magnetic substrate such as injection-molded plastic maybe used. Consequently, the granular magnetic layer provides partial cost reduction during manufacture.

An alloy with hexagonal closest packed (hcp) lattice structure composed mainly of cobalt is commonly used for magnetic layers in magnetic recording medium. It is necessary to orient the C-axis of the hcp structure to the film surface in order to obtain excellent characteristics. This orientation is accomplished in a conventional magnetic recording medium by controlling crystal orientation of an under-layer and making the magnetic layer epitaxially grow on such an under-layer. Unfortunately, in a magnetic recording mediums having a granular magnetic layer, controlling crystal orientation of the magnetic layer has been considered to be difficult because the epitaxial growth is hindered by the existence of oxides or nitrides.

Recently, it has been shown that crystal orientation control of the magnetic layer is still possible, in magnetic recording mediums having granular magnetic layers, by controlling the structure of the under-layer.

A report from the abstract of the 22nd Conference of the Magnetics Society of Japan, P. 469 (1998), entitled "Effect of Cr—Mo under-layer in a CoPt—$SiO_2$ medium" discloses that low noise was attained by provision of an under-layer of CrMo alloy for the granular magnetic layer and controlling the lattice constants of the under-layer with varied amount of molybdenum. Another document from the abstract of the 24th Conference of the Magnetics Society of Japan, p.21 (2000), entitled "A high coercive force medium that need not heating in lamination process" discloses that low noise was also attained by forming a ruthenium layer beneath the granular layer.

Unfortunately, while information in the processing field shows rapid development in recent years, this development demands much more extensive improvement over presently achieved levels for noise reduction.

OBJECTS AND SUMMARY OF THE INVENTION

It is an object of the present invention to provide a magnetic recording medium, a method for manufacturing a magnetic recording medium, and a magnetic recording device which overcome the drawbacks of the related art noted above.

It is another object of the present invention to achieve further noise reduction in a magnetic recording medium by more precise control of structure of magnetic grains.

It is another object of the present invention to provide a magnetic recording medium achieving more reduction of noise by forming a plurality of intermediate layers on an under-layer before laminating the magnetic layer.

It is another object of the present invention to provide a method for manufacturing such a medium and to provide a magnetic recording device comprising such a medium.

It is another object of the present invention to provide a magnetic recording medium and a method of manufacturing the same which provides manufacturing cost savings while maintaining or increasing recording quality.

The present invention relates to a magnetic recording medium, method of manufacturing a magnetic recording medium and magnetic recording devices wherein a plurality of non-magnetic metallic intermediate layers is laminated between an under-layer and a magnetic layer. One of the intermediate layers is composed of at least an element selected from the group consisting of Ru, Re and Os and contains oxygen, and another is composed of a CoCr alloy containing at least an element selected from the group consisting of Nb, Mo, Ru, Rh, Pd, Ta, W, Re Os, Ir and Pt. The resulting magnetic recording medium provides reduced costs and improved recording characteristics.

According to an embodiment of the present invention there is provided, a magnetic recording medium comprising: a non-magnetic substrate, at least a non-magnetic under-layer on the non-magnetic substrate, at least a first non-magnetic metallic intermediate layer on the non-magnetic under-layer, at least a second non-magnetic metallic intermediate layer on the first non-magnetic metallic intermediate layer, at least a magnetic layer on the second non-magnetic metallic intermediate layer, at least a protective film and a liquid lubricant layer sequentially laminated on the magnetic layer, the magnetic layer being a plurality of ferromagnetic grains and non-magnetic grain boundaries, the plurality of ferromagnetic grains containing at least cobalt and platinum, the non-magnetic grain boundaries including at least an oxide substantially surrounding the plurality of ferromagnetic grains, the first intermediate layer containing oxygen and being composed of at least one element selected from the group consisting of Ru, Re and Os, and the second intermediate layer being at least a CoCr alloy including at least one element selected from the group consisting of Nb, Mo, Ru, Rh, Pd, Ta, W, Re, Os, Ir and Pt.

According to another embodiment of the present invention there is provided, a magnetic recording medium, wherein: the non-magnetic substrate is at least a first plastic, the first plastic being at least one of a polycarbonate and a polyolefin.

According to another embodiment of the present invention there is provided, a magnetic recording medium, wherein: a crystal structure of the second intermediate layer is hexagonal close packed, a crystal structure of the plurality of ferromagnetic grains in the magnetic layer is hexagonal close packed, and a misfit between lattice constants of unit cells of the second intermediate layer and unit cells of the plurality of ferromagnetic grains is within ±3%.

According to another embodiment of the present invention there is provided, a magnetic recording medium, wherein: the under-layer is at least one of chromium and a chromium alloy, and at least one of a (200) lattice plane and a (211) lattice plane in the under-layer is preferentially oriented in parallel with a film surface of the under-layer.

According to another embodiment of the present invention there is provided, a method for manufacturing a magnetic recording medium comprising the steps of: laminating at least a non-magnetic under-layer on a non-magnetic substrate, laminating at least a first non-magnetic metallic intermediate layer on the non-magnetic under-layer, laminating at least a second non-magnetic metallic intermediate layer on the first non-magnetic metallic intermediate layer, laminating at least a magnetic layer on the second non-magnetic metallic intermediate layer, laminating a protective film on the magnetic layer, laminating a liquid lubricant layer on the protective film, the step of laminating the magnetic layer including laminating to form at least ferromagnetic grains and non-magnetic grain boundaries surrounding the grains, the grains being at least one of cobalt and platinum and the grain boundaries being at least an oxide, the step of laminating the first intermediate layer including laminating to form the first intermediate layer from oxygen and at least one element selected from the group consisting of Ru, Re, and Os, and the step of laminating the second intermediate layer including laminating to form the second intermediate layer from a CoCr alloy containing at least one element selected from the group consisting of Nb, Mo, Ru, Rh, Pd, Ta, W, Re, Os, Ir and Pt.

According to another embodiment of the present invention there is provided, a method for manufacturing a magnetic recording medium, wherein: the non-magnetic substrate is at least a first plastic, and the first plastic being at least one of a polycarbonate and a polyolefin.

According to another embodiment of the present invention there is provided, a method for manufacturing a magnetic recording medium, wherein: the step of laminating the second intermediate layer including laminating to form a crystal structure of the second intermediate layer as hexagonal close packed, the step of laminating the magnetic layer including laminating to form a crystal structure of the ferromagnetic grains in the magnetic layer as hexagonal close packed, and the steps of laminating the second intermediate layer and the magnetic layer including laminating to form a misfit between lattice constants of unit cells of the second intermediate layer and unit cells of the ferromagnetic grains of within ±3%.

According to another embodiment of the present invention there is provided, a method for manufacturing a magnetic recording medium, wherein: the step of laminating the under-layer including laminating to form the under-layer from at least one of chromium and a chromium alloy, and the step of laminating the under-layer including laminating to form at least one of a (200) lattice plane and a (211) lattice plane in the under-layer as preferentially oriented in parallel with a film surface of the under-layer.

According to another embodiment of the present invention there is provided, a magnetic recording device comprising: a magnetic recording medium as defined above.

According to another embodiment of the present invention, there is provided, a magnetic recording medium comprising: a non-magnetic substrate, at least a non-magnetic under-layer on the non-magnetic substrate, at least a first non-magnetic metallic intermediate layer on the non-magnetic under-layer, at least a second non-magnetic metallic intermediate layer on the first non-magnetic metallic intermediate layer, at least a magnetic layer on the second non-magnetic metallic intermediate layer, at least a protective film and a liquid lubricant layer sequentially laminated on the magnetic layer, the magnetic layer being a plurality of ferromagnetic grains and non-magnetic grain boundaries, the plurality of ferromagnetic grains containing at least cobalt and platinum, the non-magnetic grain boundaries including at least an oxide substantially surrounding the plurality of ferromagnetic grains, the first intermediate layer being at least a CoCr alloy including at least one element selected from the group consisting of Nb, Mo, Ru, Rh, Pd, Ta, W, Re, Os, Ir and Pt, and the second intermediate layer containing oxygen and being composed of at least one element selected from the group consisting of Ru, Re and Os.

According to another embodiment of the present invention, there is provided, a magnetic recording medium, wherein: the non-magnetic substrate is at least a first plastic, the first plastic being at least one of a polycarbonate or polyolefin.

According to another embodiment of the present invention, there is provided, a magnetic recording medium, wherein: a crystal structure of the first intermediate layer is hexagonal close packed, a crystal structure of the second intermediate layer is hexagonal close packed, and a misfit between lattice constants of unit cells of the first intermediate layer and unit cells of the second intermediate layer is within ±3%.

According to another embodiment of the present invention, there is provided, a magnetic recording medium, wherein: the under-layer is at least one of chromium and a chromium alloy, and at least one of a (200) lattice plane and a (211) lattice plane in the under layer is preferentially oriented in parallel with a film surface of the under-layer.

According to another embodiment of the present invention, there is provided, a method for manufacturing a magnetic recording medium comprising the steps of: laminating at least a non-magnetic under-layer on a non-magnetic substrate, laminating at least a first non-magnetic metallic intermediate layer on the non-magnetic under-layer, laminating at least a second non-magnetic metallic intermediate layer on the first non-magnetic metallic intermediate layer, laminating at least a magnetic layer on the second non-magnetic metallic intermediate layer, laminating a protective film on the magnetic layer, laminating a liquid lubricant layer on the protective film, the step of laminating the magnetic layer including laminating to form at least ferromagnetic grains and non-magnetic grain boundaries surrounding the grains, the grains being at least one of cobalt and platinum and the grain boundaries being at least an oxide, the step of laminating the first intermediate layer including laminating to form the first intermediate layer from a CoCr alloy containing at least one element selected from the group consisting of Nb, Mo, Ru, Rh, Pd, Ta, W, Re, Os, Ir and Pt, and the step of laminating the second intermediate layer including laminating to form the second intermediate layer from oxygen and at least one element selected from the group consisting of Ru, Re, and Os.

According to another embodiment of the present invention, there is provided, a method for manufacturing a magnetic recording medium, wherein: the non-magnetic substrate is at least a first plastic, and the first plastic is at least one of a polycarbonate and a polyolefin.

According to another embodiment of the present invention, there is provided, a method for manufacturing a magnetic recording medium, wherein: the step of laminating the first intermediate layer including laminating to firm a crystal structure of the first intermediate layer as hexagonal close packed, the step of laminating the second intermediate layer including laminating to form a crystal structure of the second intermediate layer as hexagonal close packed, and a misfit between lattice constants of unit cells of the first intermediate layer and unit cells of the second intermediate layer is within ±3%.

According to another embodiment of the present invention, there is provided, a method for manufacturing a magnetic recording medium, wherein: the step of laminating the under-layer including laminating to form the under-layer from at least one of chromium and a chromium alloy, and the step of laminating the under-layer including laminating to form at least one of a (200) lattice plane and a (211) lattice plane in the under-layer as preferentially oriented in parallel with a film surface of the under-layer.

According to another embodiment of the present invention there is provided, a magnetic recording device comprising: a magnetic recording medium as defined by the above eight paragraphs.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
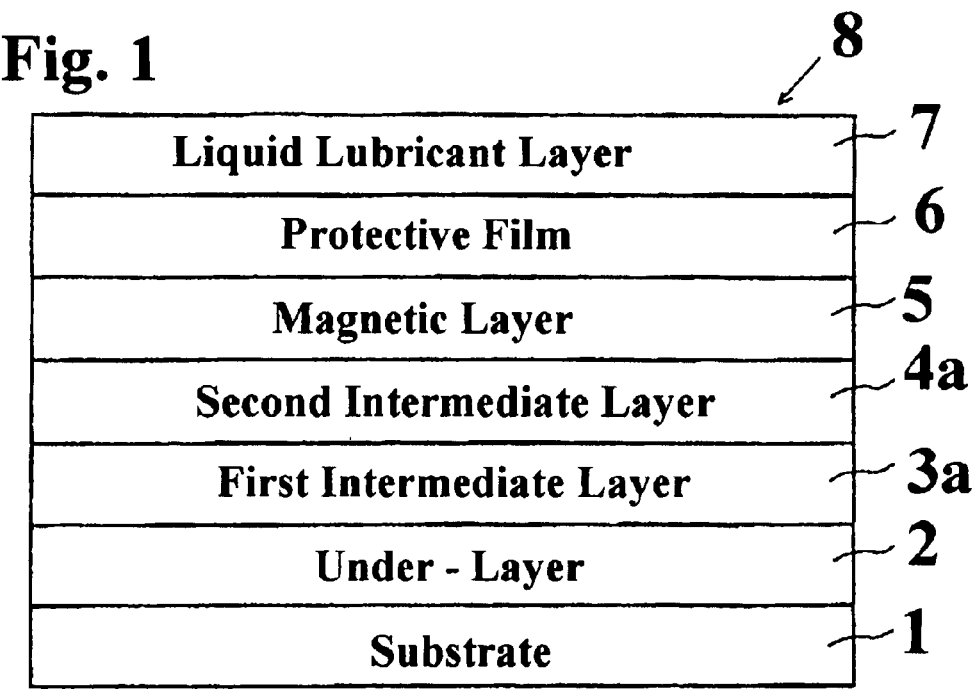
FIG. 1 is a vertical cross-sectional view of a first structure of a magnetic recording medium.

As a result of the above identified concerns, the inventors have made rigorous studies, and it is now understood that high coercive force and low media noise in magnetic recording mediums are achieved through specific material selection, material application, and manufacturing processes, as will be described.

A first structure of the invention provides, on an under-layer, a first non-magnetic metallic intermediate layer including at least an element selected from the group consisting of Ru, Re and Os and containing oxygen. On the first intermediate layer, beneath a magnetic layer, a second non-magnetic metallic intermediate layer includes a CoCr alloy containing at least an element selected from the group consisting of Nb, Mo, Ru, Rh, Pd, Ta, W, Re, Os, Ir and Pt.

It is also now understood, that high coercive force and low media noise in magnetic recording medium are achievable in a second related structure providing, on an under-layer, a first non-magnetic metallic intermediate layer including a CoCr alloy containing at least an element selected from the group consisting of Nb, Mo, Ru, Rh, Pd, Ta, W, Re, Os, Ir and Pt. On a first intermediate layer in the second structure, beneath the magnetic layer, a second non-magnetic metallic intermediate layer includes at least an element selected from the group consisting of Ru, Re and Os and contains oxygen.

In the above-described first structure, the crystal orientation of the magnetic layer is favorably controlled when the crystal structure of the second intermediate layer, and the crystal structure of the ferromagnetic grains of the magnetic layer both have a hexagonal closest packed structure, and the 'misfit' between lattice constants of unit cells of the two layers is within about ±3%. Here, the 'misfit' of lattice constants is defined by:

$$\text{misfit in a-axis} = 100 \times (a2-a3)/a2 \ (\%) \quad \text{(I)}$$

$$\text{misfit in c-axis} = 100 \times (c2-c3)/c2 \ (\%) \quad \text{(II)}$$

where a3 and c3 are lattice constants of the ferromagnetic grain of the magnetic layer, a2 and c2 are lattice constants of the second intermediate layer.

In the first structure, the best effect is gained if the both misfits are within ±3%.

In the above-described second structure, crystal orientation of the magnetic layer is favorably controlled when the crystal structure of the first intermediate layer and the crystal structure of the second intermediate layer are both hexagonal closest packed structures, and the misfit between the lattice constants of unit cells of the two layers is within ±3%. Here, the misfit of lattice constants is defined by:

$$\text{misfit in a-axis} = 100 \times (a1-a2)/a1 \ (\%) \quad \text{(III)}$$

$$\text{misfit in c-axis} = 100 \times (c1-c2)/c1 \ (\%) \quad \text{(IV)}$$

where a2 and c2 are lattice constants of the second intermediate layer; a1 and c1 are lattice constants of the first intermediate layer.

In the second structure, the best effect is gained if the both misfits are within ±3%.

First Embodiments of the Invention

Referring now to FIG. 1, in a first embodiment, a magnetic recording medium 8 has a structure in which an under-layer 2 is formed on a non-magnetic substrate 1. A first non-magnetic metallic intermediate layer 3a, a second non-magnetic metallic intermediate layer 4a, a granular magnetic layer 5, and a protective film 6 are sequentially formed on under-layer 2. A liquid lubricant layer 7 is formed on protective film 6, as will be described.

To produce a magnetic recording medium with low cost, it is effective to utilize a substrate that is manufactured by injection-molding a polycarbonate, a polyolefin or another resin. Protective film 6 is made from a thin mainly-carbon film having a thickness of from about 3 nm to 10. Liquid lubricant layer 7 is generally made from a perfluoropolyether lubricant, but other effective substances may also be used.

Magnetic layer 5 is a granular magnetic layer that includes ferromagnetic grains with non-magnetic grain boundaries surrounding the grains. The non-magnetic grain boundaries are composed of oxides or nitrides of a metal or silicon.

Magnetic layer 5 is fabricated by a lamination method employing a sputtering process using a target of ferromagnetic metal containing oxides that consist of the non-magnetic grain boundary. Alternatively, magnetic layer 5 may be fabricated by a lamination process employing a reactive sputtering process in an oxygen-containing argon gas atmosphere using a target of ferromagnetic metal.

The ferromagnetic crystals are favorably a CoPt alloy. The non-magnetic grain boundary material employs a particularly favorable stable granular structure using oxides of an element selected from the group consisting of Cr, Co, Si, Al, Ti, Ta, Hf and Zr. The film thickness of magnetic layer 5 is necessarily of sufficient thickness to obtain effective head regeneration output when regenerating a record.

Non-magnetic metallic intermediate layer 3a is a material fabricated from at least an element selected from the group consisting of elements Ru, Re and Os and contains oxygen. These elements provide a resulting stable hexagonal closest packed structure and a favorable crystal orientation controlled by containment of oxygen. During formation of non-magnetic metallic intermediate layer 3a, oxygen addition is frequently conducted by sputtering using a target containing oxygen or by sputtering in an oxygen-containing gas atmosphere. The film thickness of first intermediate layer 3a is preferably in a range from 10 nm to 50 nm.

To achieve the desired effect of both high Hc and low noise in magnetic recording medium 8, second non-magnetic metallic intermediate layer 4a employs a CoCr alloy that contains at least an element selected from the group consisting of Nb, Mo, Ru, Rh, Pd, Ta, W, Re, Os, Ir and Pt. It is noted that every metal of this group has an effect to increase the lattice constant when added to the CoCr alloy.

In the present embodiment, further effect may be obtained by both adjusting the quantity of additives in the CoCr alloy and by controlling the 'misfit' between the lattice constant of second intermediate layer 4a and the lattice constant of the ferromagnetic grains in magnetic layer 5 to within ±3%.

The 'misfit' effect arises because the ferromagnetic grains in magnetic layer 5 are easily made to epitaxially grow on intermediate layer 4a due to a decrease of the misfit of lattice constants of the two respective layers 4a, 5. In this embodiment, the film thickness of second intermediate layer 4a is preferably in the range from 2 nm to 10 nm.

Material for under-layer 2 is selected from chromium and chromium alloys including CrMo, CrTi, CrW and CrV. When the crystal orientation plane parallel to the surface of under-layer 2 is formed to preferentially orient to the (200) plane or (211) plane, the c-axis of the hexagonal closest packed structure of first intermediate layer 3a tends to strongly align in the direction of the film surface of first intermediate layer 3a. As a consequence of this strong alignment, beneficial high Hc and low noise in magnetic recording medium 8 is more easily achieved.

In the above embodiment, magnetic recording medium 8 exhibits excellent characteristics even when inexpensive plastic resin is used for substrate 1. Consequently, when such an effective magnetic recording medium is mounted on a magnetic recording device (not shown), a correspondingly cheaper but high performance device results.

Second Embodiments of the Present Invention

Figure 2:
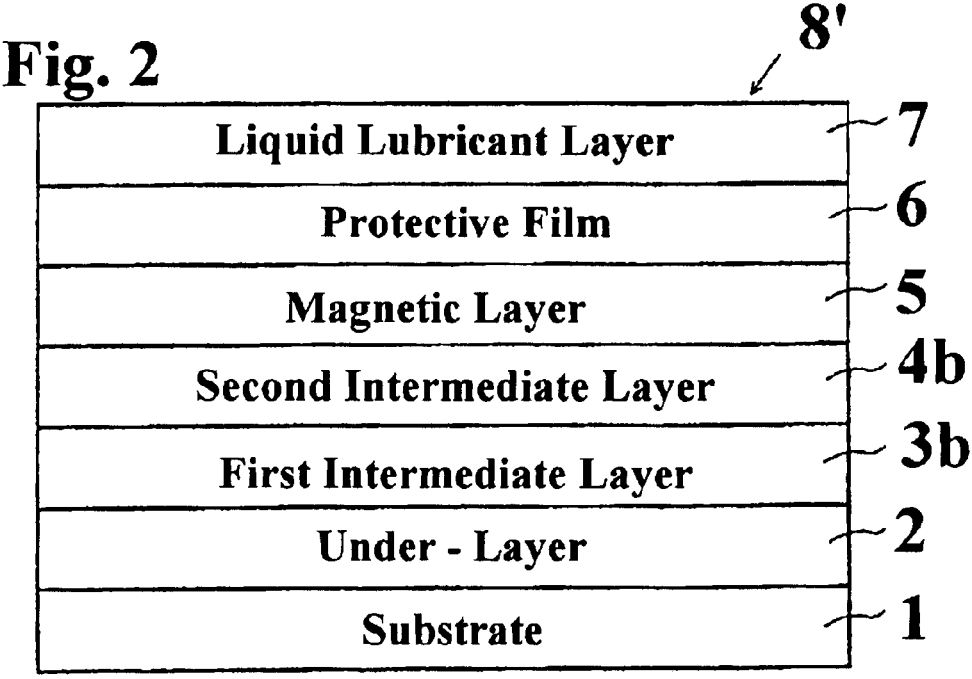
FIG. 2 is a vertical cross-sectional view of a second structure of a magnetic recording medium.

Referring now to FIG. 2, a second embodiment of a magnetic recording medium 8' has a structure in which under-layer 2 is formed on non-magnetic substrate 1. A first non-magnetic metallic intermediate layer 3b, a second non-magnetic metallic intermediate layer 4b, granular magnetic layer 5, and protective film 6 are sequentially formed on under-layer 2. Liquid lubricant layer 7 is further formed on protective film 6.

To produce a magnetic recording medium with low cost, it is effective to utilize a substrate that is manufactured by injection-molding a polycarbonate, a polyolefin or another resin. Protective film 6 is made from a thin mainly-carbon film having a thickness of from 3 nm to 10. Liquid lubricant layer 7 is generally made from a perfluoropolyether lubricant, but other substances may be used.

Magnetic layer 5 is a granular magnetic layer that includes ferromagnetic grains with non-magnetic grain boundaries surrounding the grains. The non-magnetic grain boundaries are composed of oxides or nitrides of a metal or silicon.

Magnetic layer 5 is fabricated by a lamination method employing a sputtering process using a target of ferromagnetic metal containing oxides that consist of the non-magnetic grain boundary. Alternatively, magnetic layer 5 may be fabricated by a lamination process employing a reactive sputtering process in an oxygen-containing argon gas atmosphere using a target of ferromagnetic metal.

The ferromagnetic crystals are favorably a CoPt alloy. The non-magnetic grain boundary material employs a particularly favorable stable granular structure using oxides of an element selected from the group consisting of Cr, Co, Si, Al, Ti, Ta, Hf and Zr. The film thickness of magnetic layer 5 is necessarily of sufficient thickness to obtain effective head regeneration output when regenerating a record.

In this embodiment, first intermediate layer 3b is a material employing a CoCr alloy that contains at least an element selected from the group consisting of Nb, Mo, Ru, Rh, Pd, Ta, W, Re, Os, Ir and Pt. Each metal in this group has an effect which beneficially increases the lattice constant when added to the CoCr alloy. This construction assists the beneficial effects high coercive force and low noise in magnetic recording medium 8'.

These beneficial effects are obtained by adjusting the quantity of additives in the CoCr alloy. The beneficial effects are additionally influenced by controlling the misfit between the lattice constant of first intermediate layer 3b and the lattice constant of second intermediate layer 4b to within ±3%. The beneficial misfit effect arises because the ferromagnetic grains in magnetic layer 5 are easily and epitaxially grown on second intermediate layer 4b due to the decrease of the misfit of lattice constants of the two layers 3b, 4b. The film thickness of first intermediate layer 3b is preferably in a range from 2 nm to 10 nm.

Second intermediate layer 4b is necessary a material fabricated from an element selected from the group consisting of Ru, Re and Os and contains oxygen. These selected elements have stable hexagonal closest packed structures and their crystal orientation is favorably controlled by containment of oxygen. Addition of oxygen in this layer is performed by sputtering using a target that contains oxygen or by sputtering in an oxygen-containing gas atmosphere. The film thickness of second intermediate layer 4b is preferably in a range from 10 nm to 50 nm.

Material for under-layer 2 is selected from chromium and chromium alloys including CrMo, CrTi, CrW and CrV. When the crystal orientation plane parallel to the surface of under-layer 2 is formed to preferentially orient to either the (200) plane or (211) plane, the c-axis of the hexagonal closest packed structure of first intermediate layer 3b, deposited on under-layer 2 beneficially and strongly tends align in the direction of the film surface of intermediate layer 2. As a result, beneficial high coercive force and low noise are not possible to achieved.

In the above embodiment, magnetic recording medium 8' exhibits excellent characteristics even when inexpensive plastic resin is used for substrate 1. Consequently, when such an effective magnetic recording medium is mounted on a magnetic recording device (again not shown), a correspondingly cheaper but high performance device results.

The following includes specific examples of embodiments of the present invention.

EXAMPLES 1 THROUGH 5 AND COMPARATIVE EXAMPLES 1 and 2

In the present examples, a polycarbonate substrate, used as a non-magnetic substrate, was injection-molded into a 3.5 inch disk. After cleaning, the substrate was introduced into a sputtering apparatus. An under-layer having a thickness of 15 nm was formed of Cr-20 at % Mo under an argon gas pressure of 5 mTorr.

Subsequently, a first intermediate layer having thickness of 20 nm was formed using a ruthenium target under a mixed gas at 10 mTorr. The mixed gas was a mixture of argon and 3% of oxygen. A second intermediate layer having thickness of 5 nm with one of varied compositions given in Table 1, was formed under an argon gas pressure of 5 mTorr. A granular magnetic layer having a thickness of 20 nm was formed by an RF sputtering method using a target of $Co_{78}Cr_{10}Pt_{12}$ containing 10 mol % of $SiO_2$ under an argon gas pressure of 3 mTorr. A carbon protective layer 5 nm thick was laminated onto the granular magnetic structure, and the resulting product removed from the vacuum of the sputtering apparatus.

A liquid lubricant was next applied to a thickness of 1.5 nm. As a consequence of this process, a magnetic recording medium was formed having a structure as substantially shown in FIG. 1. In the above-described laminating process, preliminary heating of the substrate was not performed.

For comparison, a first medium was produced as Comparative Example 1 in the same manner as in Example 1 with the exception except that no additive was contained in the CoCr alloy of the second intermediate layer. A second medium was produced as Comparative Example 2 in the same manner as in Example 1 except that second intermediate layer was not formed.

Table 1 shows the measured data for various compositions of the intermediate layer. The data are: the misfit between lattice constants of magnetic layer crystals and the intermediate layer that was determined by X-ray diffraction, the coercive force Hc measured by a vibrating sample magnetometer VSM, and the signal-to-noise ratio SNR that was measured at a track recording density of 270 kFCl.

TABLE 1

| | composition of second intermediate layer | | | | | |
|---|---|---|---|---|---|---|
| | Co (at %) | Cr (at %) | additive/ (at %) | misfit (%) | Hc (%) | SNR (dB) |
| Example 1 | 50 | 25 | Ru/25 | 0.8 | 3,120 | 20.7 |
| Example 2 | 50 | 35 | Ru/15 | 3.2 | 2,850 | 19.7 |
| Example 3 | 50 | 40 | W/10 | 1.9 | 3,030 | 20.2 |
| Example 4 | 50 | 44 | Pt/6 | 3.8 | 2,790 | 18.3 |
| Example 5 | 50 | 38 | Pt/12 | 0.5 | 3,090 | 21.9 |
| Comp Example 1 | 60 | 40 | none | 9.2 | 2,400 | 16.4 |
| Comp Example 2 | | none | | N.A. | 2,030 | 15.3 |

Note: misfit values in the table are the larger of the misfits in a-axis and c-axis.

As is apparent from Table 1, coercive force Hc and signal-to-noise ratio SNR significantly increase when the second intermediate layer is provided, and excellent Hc and SNR are attained if the misfit between lattice constants of the magnetic crystals and of the second intermediate layer is small.

Although the misfit values of lattice constants in Examples 1–5 range within 3.8%, the misfit of lattice constants within about ±3% is necessary to attain Hc of more than 3000 Oe and SNR of more than 20 dB, which are both required in very high density recording.

EXAMPLES 6 THROUGH 10 AND COMPARATIVE EXAMPLES 3 AND 4

As above, in the present example a polycarbonate substrate, used as a non-magnetic substrate, was injection-molded as a 3.5 inch disk. After cleaning, the substrate was introduced into a sputtering apparatus. An under-layer having thickness of 15 nm was formed of Cr-20 at % Mo under an argon gas pressure of 5 mTorr.

A first intermediate layer having thickness of 5 nm with one of varied compositions, given in Table 2, was formed under an argon gas pressure of 5 mTorr.

Subsequently, a second intermediate layer having thickness of 20 nm was formed using a ruthenium target under a mixed gas at 10 mTorr that is a mixture of argon and 3% of oxygen. A granular magnetic layer having thickness of 20 nm was formed by an RF sputtering method using a target of $Co_{78}Cr_{10}Pt_{12}$ containing 10 mol % of $SiO_2$ under an argon gas pressure of 3 mTorr.

After laminating a 5 nm thick carbon protective layer on the resulting laminate, the laminate was removed from the vacuum of the sputtering apparatus and a liquid lubricant was applied to a thickness of 1.5 nm. As a consequence of this process, a magnetic recording medium 8' having a structure as shown in FIG. 2 was formed. In the above-described laminating process, preliminary heating of the substrate was not performed.

For comparison, a medium in Comparative Example 3 was produced in the same manner as in Example 6 except that no additive was contained in the CoCr alloy of the second intermediate layer. Another medium as Comparative Example 4 was produced in the same manner as in Example 6 except that second intermediate layer was not formed.

Table 2 shows the measured data for various compositions of the first intermediate layer. As above, the data are: the misfit between lattice constants of the first non-magnetic metallic intermediate layer and the second non-magnetic metallic intermediate layer as determined by X-ray diffraction, coercive force Hc was measured by a vibrating sample magnetometer VSM, and signal-to-noise ratio SNR was measured at a track recording density of 270 kFCl.

TABLE 2

| | composition of first intermediate layer | | | | | |
|---|---|---|---|---|---|---|
| | Co (at %) | Cr (at %) | additive/ (at %) | misfit (%) | Hc (%) | SNR (dB) |
| Example 6 | 50 | 25 | Ru/25 | 1.1 | 3,070 | 20.3 |
| Example 7 | 50 | 35 | Ru/15 | 3.6 | 2,780 | 19.0 |
| Example 8 | 50 | 40 | W/10 | 2.3 | 3,000 | 19.9 |
| Example 9 | 50 | 44 | Pt/6 | 4.3 | 2,700 | 17.2 |
| Example 10 | 50 | 38 | Pt/12 | 0.4 | 3,190 | 22.4 |
| Comp Example 3 | 60 | 40 | none | 13.1 | 2,200 | 16.0 |
| Comp Example 4 | | none | | N.A. | 2,030 | 15.3 |

Note: misfit values in the table are the larger of the misfits in a-axis and c-axis.

As is apparent from Table 2, Hc and SNR significantly increase when the first intermediate layer is provided, and excellent Hc and SNR are attained when the misfit between lattice constants of the first intermediate layer and of the second intermediate layer is small. Although the misfit values of lattice constants in the Examples ranges within 4.3%, the misfit of lattice constant of within ±3% is necessary to attain Hc of more than 3000 Oe and SNR of more than 20 dB, both required in very high density recording.

In the first structure of the present invention, high coercive force and low media noise for magnetic recording mediums are achieved primarily because crystal orientation of the magnetic layer is favorably controlled in the first structure of the present invention by forming, on the under-layer, a first intermediate layer constructed from at least an element selected from the group consisting of Ru, Re and Os and contains oxygen, and on the first intermediate layer and beneath the magnetic layer, a second intermediate layer that formed from a CoCr alloy containing at least an element selected from the group consisting of Nb, Mo, Ru, Rh, Pd, Ta, W, Re, Os, Ir and Pt.

When the crystal structure of the second intermediate layer and the crystal structure of the ferromagnetic grains of the magnetic layer, in the above-described first structure are both hexagonal close packed structures and the misfit between lattice constants of unit cells of the two layers is within ±3%, ferromagnetic grains readily grow epitaxially on the intermediate layer. Consequently, the crystal orientation of the magnetic layer is favorably controlled.

According to the present invention, since high coercive force is readily achieved in a magnetic recording mediums by employing such an intermediate layer, substrate heating is not required in the lamination process. Excellent characteristics are exhibited by a medium employing an inexpensive plastic resin substrate, as noted above, as well as conventional substrates of aluminum or glass. When a magnetic recording medium of the present invention is mounted on a magnetic recording device, a less expensive and high performance device is easily provided.

In the second structure according to the present invention, high Hc and low media noise in a magnetic recording medium are achieved because crystal orientation of the magnetic layer is favorably controlled by forming, on the under-layer, a first intermediate layer being a CoCr alloy containing at least an element selected from the group consisting of Nb, Mo, Ru, Rh, Pd, Ta, W, Re, Os, Ir and Pt, and on the first intermediate layer and beneath the magnetic layer, a second intermediate layer having at least an element selected from the group consisting of Ru, Re and Os and contains oxygen.

In this embodiment, when the crystal structure of the first intermediate layer and the second intermediate layer are both a hexagonal close packed structure, and the misfit between lattice constants of unit cells of the two layers is within ±3%, ferromagnetic grains epitaxially grow readily on the intermediate layer through orientation control of the second non-magnetic intermediate layer. Consequently, the crystal orientation of the magnetic layer is more favorably controlled.

According to the present invention, since high coercive force is readily achieved in a magnetic recording mediums by employing such a non-magnetic intermediate layer, substrate is unnecessary and cost savings results while excellent characteristics are maintained by mediums employing either an inexpensive plastic resin substrate or conventional substrates of aluminum or glass. The present invention allows for reduced manufacturing costs while providing a higher performance.

Having described preferred embodiments of the invention with reference to the accompanying drawings, it is to be understood that the invention is not limited to those precise embodiments, and that various changes and modifications maybe effected therein by one skilled in the art without departing from the scope or spirit of the invention as defined in the appended claims.

What is claimed is:

1. A magnetic recording medium comprising:
   a non-magnetic substrate;
   at least a non-magnetic under-layer on said non-magnetic substrate;
   at least a first non-magnetic metallic intermediate layer on said non-magnetic under-layer;
   at least a second non-magnetic metallic intermediate layer on said first non-magnetic metallic intermediate layer;
   at least a magnetic layer on said second non-magnetic metallic intermediate layer;
   at least a protective film and a liquid lubricant layer sequentially laminated on said magnetic layer;
   said magnetic layer being a plurality of ferromagnetic grains and non-magnetic grain boundaries;
   said plurality of ferromagnetic grains containing at least cobalt and platinum;
   said non-magnetic grain boundaries including at least an oxide substantially surrounding said plurality of ferromagnetic grains;
   said first intermediate layer containing oxygen and being composed of at least one element selected from the group consisting of Ru, Re and Os; and
   said second intermediate layer being at least a CoCr alloy including at least one element selected from the group consisting of Nb, Mo, Ru, Rb, Pd, Ta, W, Re, Os, Ir and Pt.

2. A magnetic recording medium according to claim 1, wherein: said non-magnetic substrate is at least a first plastic; said first plastic being at least one of a polycarbonate and a polyolefin.

3. A magnetic recording medium according to claim 1, wherein: said under-layer is at least one of chromium and a chromium alloy; and at least one of a (200) lattice plane and a (211) lattice plane in said under-layer is preferentially oriented in parallel with a film surface of said under-layer.

4. A magnetic recording device comprising: a magnetic recording medium as defined by claim 1.

5. A magnetic recording medium comprising:
   a non-magnetic substrate;
   at least a non-magnetic under-layer on said non-magnetic substrate;
   at least a first non-magnetic metallic intermediate layer on said non-magnetic under-layer;
   at least a second non-magnetic metallic intermediate layer on said first non-magnetic metallic intermediate layer;
   at least a magnetic layer on said second non-magnetic metallic intermediate layer;
   at least a protective film and a liquid lubricant layer sequentially laminated on said magnetic layer;
   said magnetic layer being a plurality of ferromagnetic grains and non-magnetic grain boundaries;
   said plurality of ferromagnetic grains containing at least cobalt and platinum; said non-magnetic grain boundaries including at least an oxide substantially surrounding said plurality of ferromagnetic grains;
   said first intermediate layer being at least a CoCr alloy including at least one element selected from the group consisting of Nb, Mo, Ru, Rh, Pd, Ta, W, Re, Os, Ir and Pt; and
   said second intermediate layer containing oxygen and being composed of at least one element selected from the group consisting of Ru, Re and Os.

6. A magnetic recording medium according to claim 5, wherein: said non-magnetic substrate is at least a first plastic; said first plastic being at least one of a polycarbonate or polyolefin.

7. A magnetic recording medium according to claim 5, wherein said under-layer is at least one of chromium and a chromium alloy; and at least one of a (200) lattice plane and a (211) lattice plane in said under layer is preferentially oriented in parallel with a film surface of said under-layer.

8. A magnetic recording device comprising: a magnetic recording medium as defined by claim 5.

9. A magnetic recording medium comprising:

a non-magnetic substrate;

at least a non-magnetic under-layer on said non-magnetic substrate;

at least a first non-magnetic metallic intermediate layer on said non-magnetic under-layer;

at least a second non-magnetic metallic intermediate layer on said first non-magnetic metallic intermediate layer;

at least a magnetic layer on said second non-magnetic metallic intermediate layer;

at least a protective film and a liquid lubricant layer sequentially laminated on said magnetic layer;

said magnetic layer being a plurality of ferromagnetic grains and non-magnetic grain boundaries;

said plurality of ferromagnetic grains containing at least cobalt and platinum;

said non-magnetic grain boundaries including at least an oxide substantially surrounding said plurality of ferromagnetic grains;

said first intermediate layer containing oxygen and being composed of at least one element selected from the group consisting of Ru, Re and Os;

said second intermediate layer being at least a CoCr alloy including at least one element selected from the group consisting of Nb, Mo, Ru, Rh, Pd, Ta, W, Re, Os, Ir and Pt;

a crystal structure of said second intermediate layer is hexagonal close packed;

a crystal structure of said plurality of ferromagnetic grains in said magnetic layer is hexagonal close packed; and a misfit between lattice constants of unit cells of said second intermediate layer and unit cells of said plurality of ferromagnetic grains is within ±3%.

10. A magnetic recording medium comprising:

a non-magnetic substrate;

at least a non-magnetic under-layer on said non-magnetic substrate;

at least a first non-magnetic metallic intermediate layer on said non-magnetic under-layer;

at least a second non-magnetic metallic intermediate layer on said first non-magnetic metallic intermediate layer;

at least a magnetic layer on said second non-magnetic metallic intermediate layer;

at least a protective film and a liquid lubricant layer sequentially laminated on said magnetic layer;

said magnetic layer being a plurality of ferromagnetic grains and non-magnetic grain boundaries;

said plurality of ferromagnetic grains containing at least cobalt and platinum;

said non-magnetic grain boundaries including at least an oxide substantially surrounding said plurality of ferromagnetic grains;

said first intermediate layer being at least a CoCr alloy including at least one element selected from the group consisting of Nb, Mo, Ru, Rh, Pd, Ta, W, Re, Os, Ir and Pt;

said second intermediate layer containing oxygen and being composed of at least one element selected from the group consisting of Ru, Re and Os;

a crystal structure of said first intermediate layer is hexagonal close packed;

a crystal structure of said second intermediate layer is hexagonal close packed; and a misfit between lattice constants of unit cells of said first intermediate layer and unit cells of said second intermediate layer is within ±3%.

* * * * *